United States Patent [19]

Lo

[11] Patent Number: 5,456,591
[45] Date of Patent: Oct. 10, 1995

[54] APPARATUS FOR PREFORMING A MAIN BODY OF A RACKET FRAME FROM A SOFTENED FIBER REINFORCED THERMOPLASTIC RESIN COMPOSITE TUBE

[75] Inventor: Kun-Nan Lo, No. 33, Hsiang-Ho Rd., Li-Lun Tsun, Tan-Tzu Hsiang, Taichung Hsien, Taiwan

[73] Assignee: Lo; Kun-Nan, Taichung Hsien, Taiwan

[21] Appl. No.: 279,848

[22] Filed: Jul. 26, 1994

[51] Int. Cl.$^6$ .............................. B29C 53/08; B29C 70/28
[52] U.S. Cl. .............................. 425/374; 156/196; 156/245; 156/443; 264/258; 264/339; 425/392; 425/394; 425/423
[58] Field of Search .................................. 264/250, 257, 264/258, 294, 339, 322; 156/196, 245, 443; 425/374, 392, 394, 423

[56] References Cited

U.S. PATENT DOCUMENTS 4,648,934  3/1987  Kiss ........................................ 425/374

FOREIGN PATENT DOCUMENTS

| 2914633 | 10/1980 | Germany | 264/339 |
| 450790 | 1/1950 | Italy | 156/196 |
| 794142 | 4/1958 | United Kingdom | 156/196 |
| 915476 | 1/1963 | United Kingdom | 156/196 |

Primary Examiner—Jay H. Woo
Assistant Examiner—Robert B. Davis
Attorney, Agent, or Firm—Oblon, Spivak, McClelland, Maier & Neustadt

[57] ABSTRACT

An apparatus for preforming a main body of a racket frame from a softened fiber reinforced thermoplastic resin composite tube includes an inner mold which has a base with a flat face that has an X axis and a Y axis perpendicular to the X axis. The inner mold further has a protrusion projecting from the flat face. The protrusion has an outer periphery which conforms with a contour of a racket frame and which confines a head-like portion and a shaft-like portion along the Y axis. A pressing unit for pressing the composite tube against the outer periphery includes a frame reciprocatable along the Y axis by means of a driving unit, two support members disposed opposite to each other and fixed respectively to the movable frame, two rolls mounted respectively to the support members, and a biasing unit for biasing each roll to press the composite tube against the outer periphery. An outer mold has two opposite halves disposed on two sides of the inner mold and movable along the X axis by means of a moving unit. Each half has a molding face. The molding faces of the halves confine a cavity with the outer periphery and the flat face along the outer periphery when the halves are moved toward the protrusion so as to be combined therewith.

2 Claims, 6 Drawing Sheets

APPARATUS FOR PREFORMING A MAIN BODY OF A RACKET FRAME FROM A SOFTENED FIBER REINFORCED THERMOPLASTIC RESIN COMPOSITE TUBE

BACKGROUND OF THE INVENTION

1. Field of the Invention

This invention relates to an apparatus for making a racket frame, more particularly to an apparatus for preforming a main body of a racket frame from a softened fiber reinforced thermoplastic resin composite tube.

2. Description of the Related Art

Fiber reinforced composite materials have gradually replaced metal alloys as the primary material in the manufacture of exercise equipments due to their relatively light weight and ability to be cast to form a wide variety of exercise equipments. Presently, majority of the racket frames that are available in the market are made of a fiber reinforced thermosetting resin composite material which is formed of unidirectional prepreg. There are also racket frames which are made of a thermoplastic resin composite material that is formed by injection forming, braiding or filament winding. However, a thermoplastic resin composite racket frame formed of unidirectional prepreg is not disclosed because the raw thermoplastic resin composite material is relatively hard such that the production thereof is difficult.

Accordingly, in co-pending U.S. patent application Ser. No. 08/079,756, the applicant disclosed a method for manufacturing a fiber reinforced thermoplastic resin composite racket frame. In the co-pending application, a thermoplastic resin composite material formed of unidirectional prepreg is used. The process steps includes: (a) cutting a thermoplastic resin composite fabric formed of unidirectional prepreg into sheets of predetermined size and fiber orientation angle; (b) preforming a tube including: stacking the sheets of thermoplastic resin composite fabric; heating the stacked sheets to a predetermined softening temperature of the stacked sheets; wrapping the heated sheets around a mandrel to form the tube; and withdrawing the tube from the mandrel; and (c) shaping the tube into a racket frame by placing the tube inside a mold.

SUMMARY OF THE INVENTION

The objective of the present invention is to provide an apparatus for preforming conveniently a main body of a racket frame from a softened fiber reinforced thermoplastic resin composite tube, which tube can be manufactured by the method disclosed in the co-pending U.S. patent application Ser. No. 08/079,756 and is then heated to a softening temperature thereof.

The apparatus according to this invention comprises an inner mold which has a base with a two-dimensional flat face having an X axis and a Y axis perpendicular to the X axis. The inner mold further has a shape-forming protrusion projecting from the flat face. The shape-forming protrusion has an outer periphery which conforms with a contour of a racket frame and which confines a first portion that is shaped like a head of the racket frame and a second portion that is shaped like a shaft of the racket frame and that extends along the Y axis. A pressing means is used for pressing a softened fiber reinforced thermoplastic resin composite tube against the outer periphery of the shape-forming protrusion, and includes a movable frame which is reciprocatable along the Y axis, a pair of spaced support members disposed opposite to each other and fixed respectively to the movable frame, a pair of rotatable rolls mounted respectively to the support members, means for biasing each of the rolls to press the softened fiber reinforced thermoplastic resin composite tube against the outer periphery, and means for driving the movable frame to move to-and-fro along the Y axis in order to urge the rolls to press the softened fiber reinforced thermoplastic resin composite tube against the outer periphery so as to bend the softened fiber reinforced thermoplastic resin composite tube to contour the outer periphery. An outer mold has two opposite halves disposed on two sides of the inner mold and movable along the X axis. Each of the halves has a molding face. The molding faces of the halves confine a cavity with the outer periphery of the shape-forming protrusion and the flat face along the outer periphery when the halves are moved toward the shape-forming protrusion so as to be combined therewith. The apparatus of this invention further has a moving means which is used for moving withdrawably the halves of the outer mold toward the shape-forming protrusion along the X axis in order to position the bent softened fiber reinforced thermoplastic resin composite tube, thereby preforming the main body of the racket frame after the bent softened fiber reinforced thermoplastic resin composite tube is cooled to harden the tube.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENT

Figure 1:
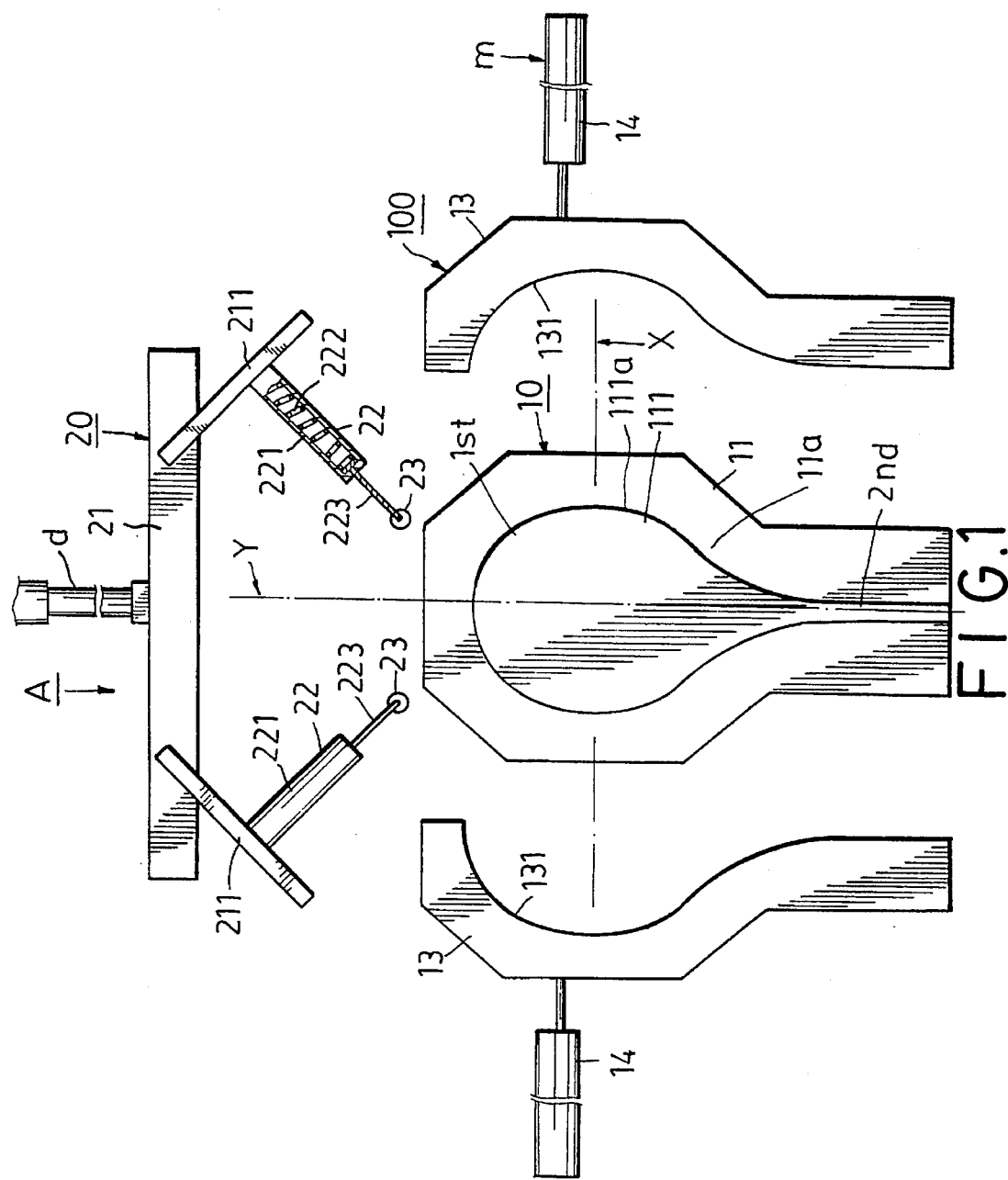
FIG. 1 is a schematic view of an apparatus of this invention for preforming a main body of a racket frame from a softened fiber reinforced thermoplastic resin composite tube.
Figure 2:
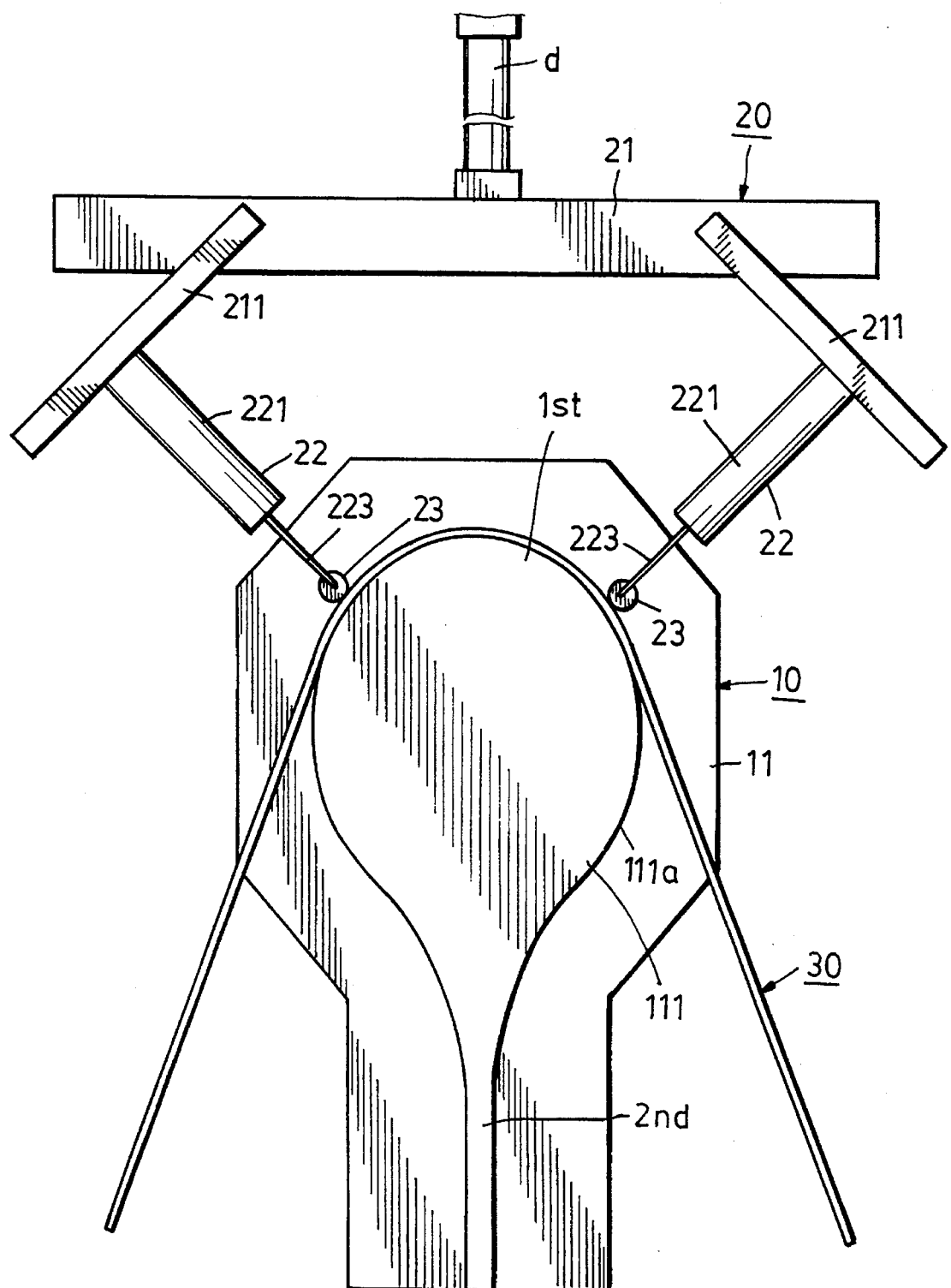
FIG. 2 is a schematic view showing the operation of a pressing means of the apparatus.
Figure 3:
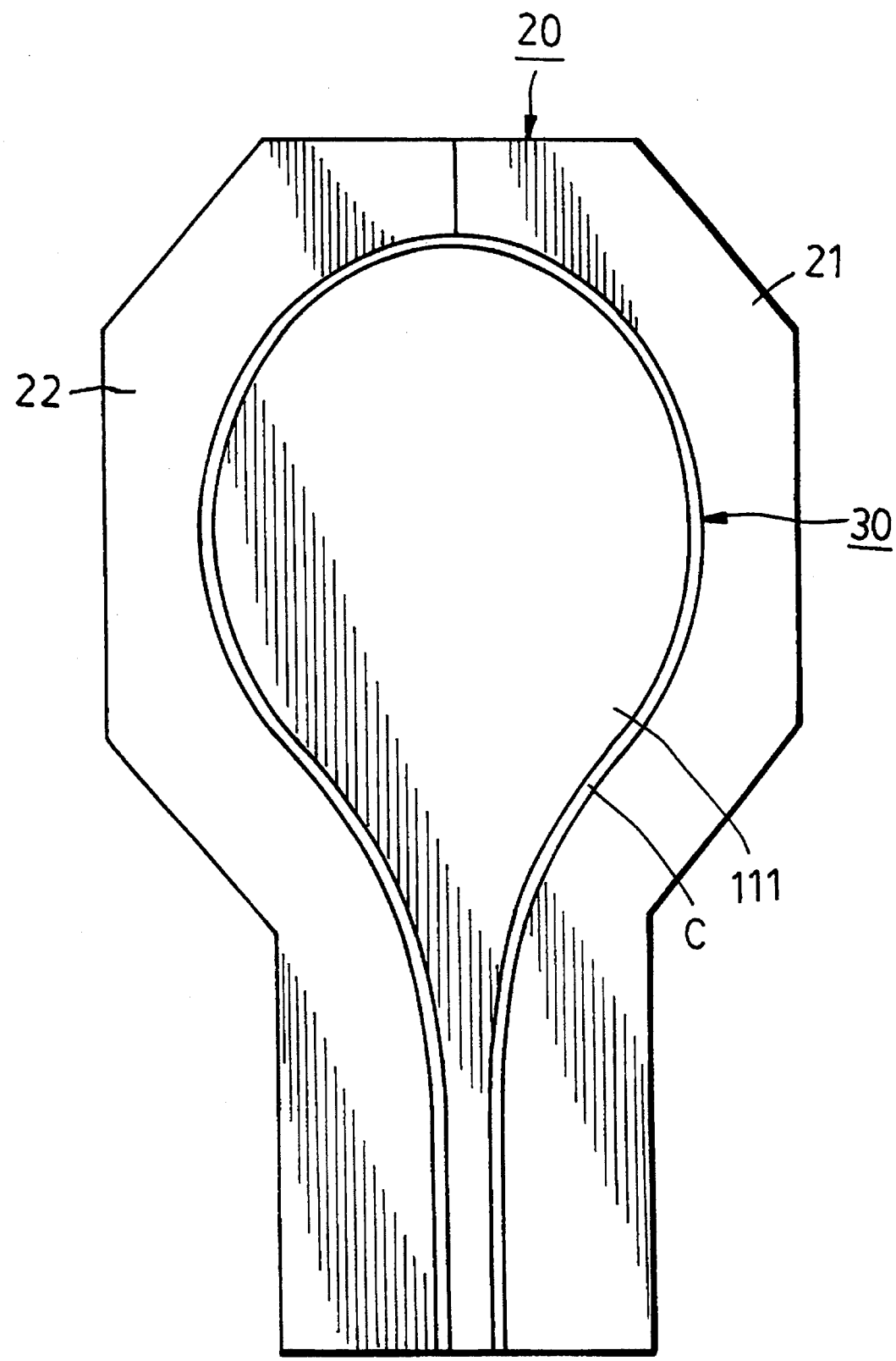
FIG. 3 is an assembled view of an inner mold and an outer mold of the apparatus.

Referring to FIGS. 1 to 3, an apparatus (A) of this invention is used for preforming a main body of a racket frame from a softened fiber reinforced thermoplastic resin composite tube. The apparatus (A) has an inner mold 10 which has a base 11 with a two-dimensional flat face (11a). The flat face (11a) has an X axis (X) and a Y axis (Y) perpendicular to the X axis (X). The inner mold 10 further has a shape-forming protrusion 111 projecting from the flat face (11a). The shape-protrusion 111 has an outer periphery (111a) which conforms with a contour of a racket frame and which confines a first portion (1st) that is shaped like a head of the racket frame and a second portion (2nd) that is shaped like a shaft of the racket frame and that extends along the Y axis (Y).

A pressing unit 20 is used for pressing a softened fiber reinforced thermoplastic resin composite tube 30 against the outer periphery (111a) of the shape-forming protrusion (111) in order to bend the softened fiber reinforced thermoplastic resin composite tube 30 to contour the outer periphery (111a). The pressing unit 20 includes a movable frame 21, which is reciprocatable along the Y axis (Y) by means of a driving unit (d), and a pair of spaced support members 22 disposed opposite to each other. Each of the support members 22 includes a supporting rod 211 fixed to the movable frame 21, a hollow cylindrical casing 221 having a first end fixed to the supporting rod 211 and a second end formed with a through-hole, and a mounting rod 223 having a first end received slidably in the hollow cylindrical casing 22 and a second end extending outwardly through the through-hole. The pressing unit 20 further has a pair of rolls 23, each of which being mounted rotatably to the second end of the mounting rod 23, and means for biasing each of the rolls 23 to press the softened fiber reinforced thermoplastic resin composite tube 30 against the outer periphery (111a). The biasing means includes a compression spring 222 which is retained in the hollow cylindrical casing 221 to abut the first end of the mounting rod 223, thereby biasing the roll 23 to press the softened fiber reinforced thermoplastic resin composite tube 30 against the outer periphery (111a).

An outer mold 100 has two opposite halves 13 disposed on two sides of the inner mold 10 and movable along the X axis (X) by means of a moving unit (m). Each half 13 has a molding face 131. The molding faces 131 of the halves 13 confine a cavity (C) with the outer periphery (111a) of the shape-forming protrusion 111 and the flat face (11a) along the outer periphery (111a) when the halves 13 are moved toward the shape-forming protrusion 111 so as to be combined therewith. The moving unit (m) includes a pair of cylinders 14 which actuate respectively the halves 13 to move withdrawably toward the shape-forming protrusion 111 along the X axis (X) in order to position the bent softened fiber reinforced thermoplastic resin composite tube 30, thereby preforming a main body of the racket frame after the bent softened fiber reinforced thermoplastic resin composite tube 30 is cooled to harden the tube 30.

Referring again to FIGS. 1, 2 and 3, in order to preform a main body of a racket frame with the use of the apparatus (A) of this invention, a fiber reinforced thermoplastic resin composite tube 30 is heated primarily to a softening temperature thereof and is then placed adjacent to the first portion (1st) confined by the outer periphery (111a) of the protrusion 11 of the inner mold 10. The driving unit (d) drives the movable frame 21 to move to-and-fro along the Y axis (Y) in order to urge the rolls 23 to press the softened fiber reinforced thermoplastic resin composite tube 30 against the outer periphery (111a) so as to bend the softened fiber reinforced thermoplastic resin composite tube 30 to contour the outer periphery (111a). In a succeeding step, the cylinders 14 of the moving unit (m) move withdrawably the halves 13 of the outer mold 100 toward the protrusion 111 along the X axis (X) in order to dispose the halves 13 around the protrusion 111 so as to position the bent softened fiber reinforced thermoplastic resin composite tube 30. In this way, a main body 40 of a racket frame, which is shown in FIG. 4, is preformed after the bent softened fiber reinforced thermoplastic resin composite tube 30 is cooled to harden the tube 30.

Figure 4:
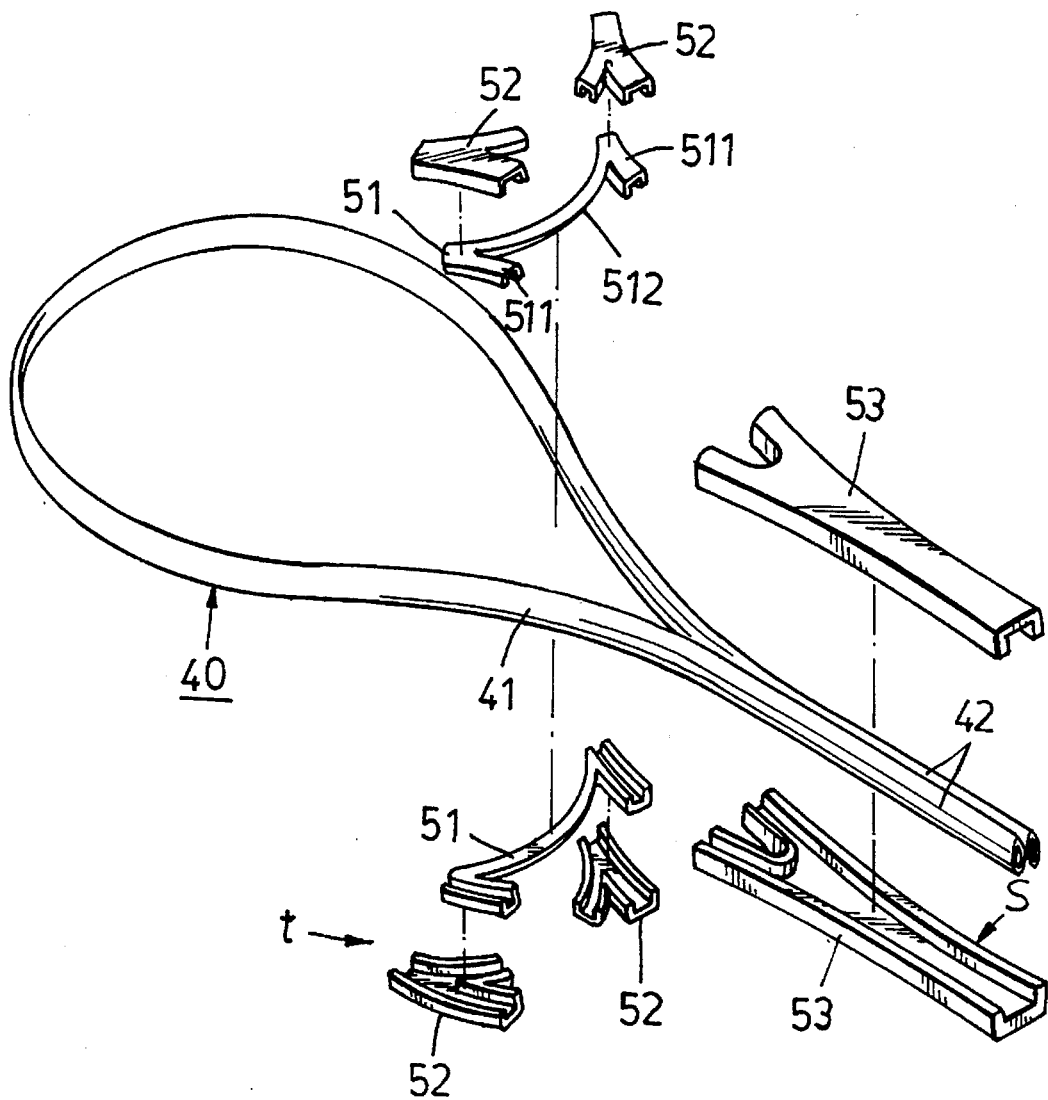
FIG. 4 is an exploded view showing a main body of a racket frame, which is preformed by the use of the apparatus of this invention, a throat-reinforcing member and a shaft-reinforcing member.
Figure 5:
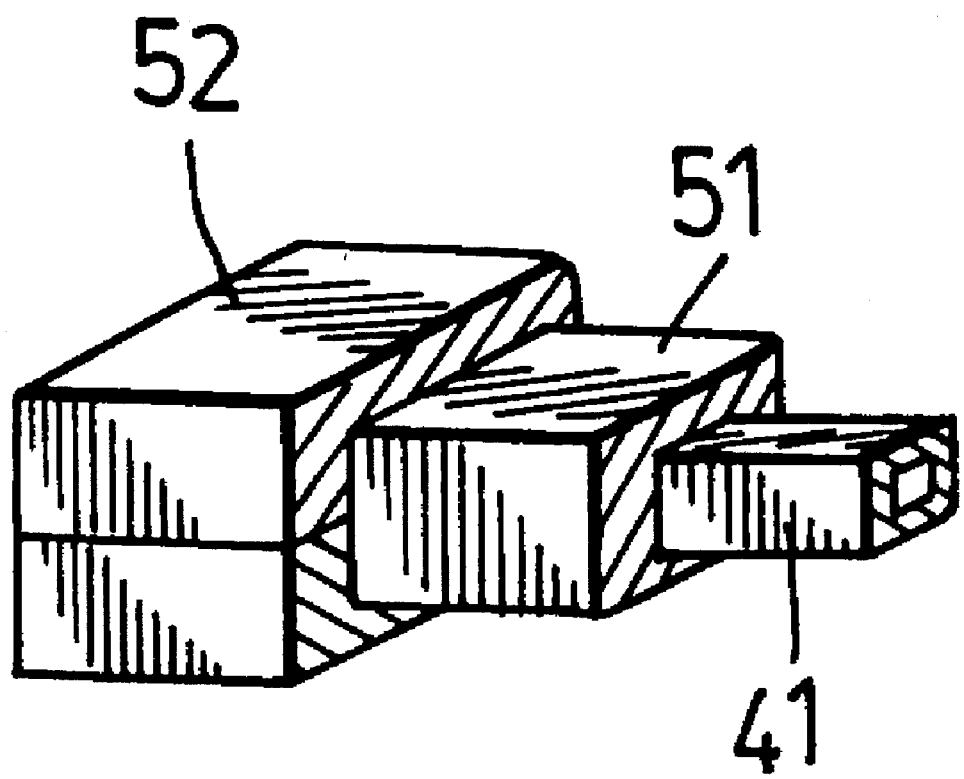
FIG. 5 is a sectional view showing assembly of the main body of the racket frame and the throat-reinforcing member.
Figure 6:
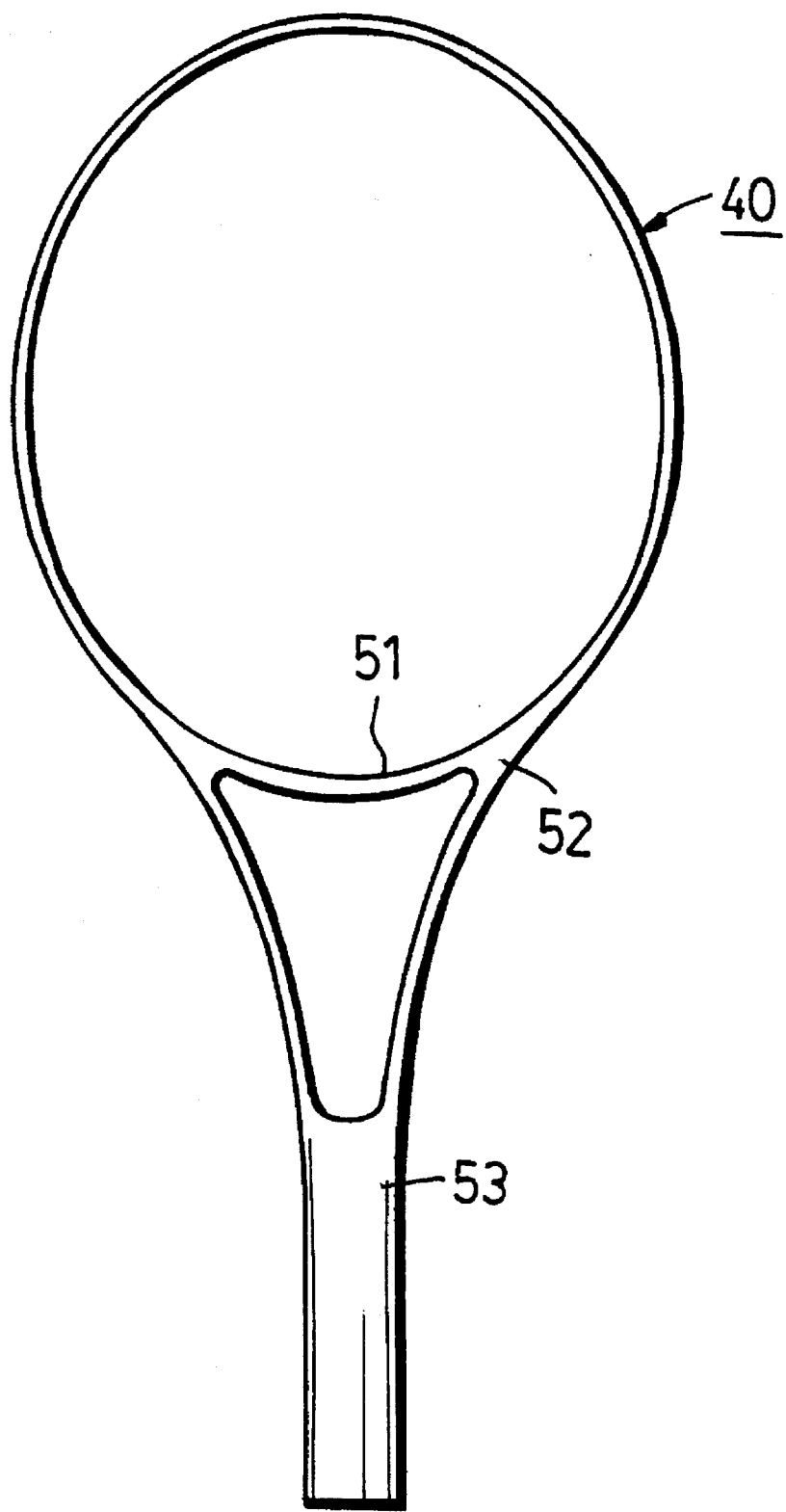
FIG. 6 is a schematic view of a racket frame.

Referring to FIG. 4, the preformed main body 40 of the racket frame has a head part (40a), a neck part 41 and a shaft part 42 consisting of two juxtaposed portions of the fiber reinforced thermoplastic resin composite tube. Referring to FIGS. 4 and 5, a first reinforcing member (t) includes a pair of bridging halves 51 and two pairs of substantially Y-shaped halves 52. Each bridging half 51 has two opposite retaining parts 511 and an intermediate bridging part 512. The bridging halves 51 are combined together in order to receive two spaced portions of the neck part 41 within the retaining parts 511 so as to bridge the two spaced portions of the neck part 41 and to complement simultaneously the head part (40a) with the intermediate bridging part 512. After the bridging halves 51 are attached to the main body 40, the Y-shaped halves 52 are used to envelop the bridging halves 51. A second reinforcing member (s) has two fork-like halves 53. When the two fork-like halves 53 are closed together, elongated shaft portions of the fork-like halves 53 retain the shaft part 42 therein while the forked portions of the fork-like halves 53 retain portions of the neck part 41 therein. The preformed main body 40 of the racket frame, along with the first reinforcing member (t) and the second reinforcing member (s), is placed in a mold in order to be heated under high temperature and high pressure. After the mold is cooled, a racket frame as shown in FIG. 6 can be obtained. The racket frame undergoes subsequently several finishing operations, such as polishing, grinding, spraying-painting, printing, etc., in order to obtain a finished racket frame.

In addition, the fiber reinforced thermoplastic resin composite tube 30, which is to be heated to a softening temperature for use in the manufacture of the main body 40 of the racket frame, can be produced by performing following steps: stacking a plurality of unidirectional thermoplastic prepreg sheets of predetermined size and fiber orientation; heating the stacked prepreg sheets into a softened layer; wrapping the softened layer around a mandrel to form a tube; cooling the mandrel and the tube formed thereon; and drawing the tube from the mandrel. In this way, the preformed main body of the racket frame can have high specific strength and specific modulus characteristics.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An apparatus for preforming a main body of a racket frame from a softened fiber reinforced thermoplastic resin composite tube, comprising:

an inner mold having a base with a two-dimensional flat face with an X axis and a Y axis perpendicular to said X axis, said inner mold further having a shape-forming protrusion projecting from said flat face, said shape-forming protrusion having an outer periphery which conforms with a contour of said racket frame and which confines a first portion that is shaped like a head of said racket frame and a second portion that is shaped like a shaft of said racket frame and that extends along said Y axis;

means for pressing said softened fiber reinforced thermoplastic resin composite tube against said outer periphery of said shape-forming protrusion, said pressing means including a movable frame which is reciprocatable along said Y axis, a pair of spaced support members disposed opposite to each other and fixed respectively to said movable frame, a pair of rotatable rolls mounted respectively to said support members, means for biasing each of said rolls to press said softened fiber reinforced thermoplastic resin composite tube against said outer periphery, and means for driving said movable frame to move to-and-fro along said Y axis in order to urge said rolls to press said softened fiber reinforced thermoplastic resin composite tube against said outer periphery so as to bend said softened fiber reinforced thermoplastic resin composite tube to contour said outer periphery;

an outer mold having two opposite halves disposed on two sides of said inner mold and movable along said X axis, each of said halves having a molding face, the molding faces of said halves confining a cavity with said outer periphery of said shape-forming protrusion and said flat face along said outer periphery when said halves are moved toward said shape-forming protrusion so as to be combined therewith; and means for moving withdrawably said halves of said outer mold toward said shape-forming protrusion along said X axis in order to position the bent softened fiber reinforced thermoplastic resin composite tube, thereby preforming said main body of said racket frame after said bent softened fiber reinforced thermoplastic resin composite tube is cooled to harden said tube.

2. An apparatus as claimed in claim 1, wherein each of said support members includes a supporting rod fixed to said movable frame, a hollow cylindrical casing having a first end mounted to said supporting rod and a second end formed with a through-hole, a mounting rod having a first end received slidably in said hollow cylindrical casing and a second end extending outwardly through said through-hole, said second end being mounted with a respective one of said rolls, said biasing means including a compression spring retained in said hollow cylindrical casing to bias said first end of said mounting rod.

* * * * *

UNITED STATES PATENT AND TRADEMARK OFFICE
CERTIFICATE OF CORRECTION

PATENT NO.   :  5,456,591
DATED        :  October 10, 1995
INVENTOR(S)  :  Kun-Nan LO, et al.

It is certified that error appears in the above-indentified patent and that said Letters Patent is hereby corrected as shown below:

On the title page, Item [19] should read:

--Lo, et al.--

On the title page, Item [75], the inventorship should read:

--Kun-Nan Lo, No. 33, Hsiang-Ho Rd., Li-Lin Tsun, Tan-Tzu Hsiang, Taichung Hsien, Taiwan; Peter J.C. Chou, No. 7, Lane 52, Sec. 3, Jen-Ho Rd., Pei-Tun Dist., Taichung City, Taiwan--

Signed and Sealed this

Twenty-third Day of January, 1996

Attest:

BRUCE LEHMAN

*Attesting Officer*    *Commissioner of Patents and Trademarks*